United States Patent [19]

MacKenzie, Jr. et al.

[11] 4,006,283
[45] Feb. 1, 1977

[54] PREPARATION OF DI-TERTIARY BUTYL PEROXIDE CROSSLINK POLYOLEFIN MATERIALS

[75] Inventors: Burton Thornley MacKenzie, Jr., Monroe; Maurice Prober, Fairfield; Edward Vincent Wilkus, Trumbull, all of Conn.

[73] Assignee: General Electric Company, New York, N.Y.

[22] Filed: Dec. 23, 1974

[21] Appl. No.: 535,196

[52] U.S. Cl. .................................. 526/57; 526/21; 526/22
[51] Int. Cl.² .................... C08J 3/24; C08K 5/14
[58] Field of Search .............. 260/94.9 GA; 526/21, 526/22, 57

[56] References Cited

UNITED STATES PATENTS

| | | | |
|---|---|---|---|
| 2,888,424 | 5/1959 | Precopio et al. | 260/94.9 GA |
| 3,105,057 | 9/1963 | Medalia | 260/94.9 GA |
| 3,242,159 | 3/1966 | Kaufman | 260/94.9 GA |
| 3,576,933 | 4/1971 | Bates et al. | 264/94 |

*Primary Examiner*—John Kight, III
*Attorney, Agent, or Firm*—R. G. Simkins; P. L. Schlamp; F. L. Neuhauser

[57] ABSTRACT

Method of applying liquid di-tertiary butyl peroxide as a curing agent to a crosslink curable polyolefin material. The method comprises adding the liquid curing agent to the polyolefin material in the form of finely divided discrete particles.

25 Claims, No Drawings

PREPARATION OF DI-TERTIARY BUTYL PEROXIDE CROSSLINK POLYOLEFIN MATERIALS

BACKGROUND OF THE INVENTION

Organic peroxides have long been used as free radical-forming curing agents for crosslink curable polyolefins such as polyethylene and copolymers of ethylene, as is shown by U.S. Pat. Nos. 2,628,214 and 2,826,570.

Di-tertiary butyl peroxide comprises one of many free radical-generating peroxide crosslink curing agents identified in the patent literature as suitable for crosslink curing polyolefin materials. For example, see U.S. Pat. Nos. 2,710,291; 2,919,474; 3,201,503; 3,209,055; 3,234,197; 3,257,352; 3,372,139; 3,522,222; 3,632,680 and 3,661,877. Di-tertiary butyl peroxide, moreover, constitutes a peroxide compound having several highly significant economic and other benefits with respect to its use as a crosslinking curing agent. Namely, in addition to being a relatively low cost material in relation to other organic peroxides, di-tertiary butyl peroxide is characterized by a very high ratio of active oxygen with respect to its weight, among other possible advantageous attributes. For instance, the cost of di-tertiary butyl peroxide is approximately one-half of that of di-$\alpha$-cumyl peroxide which substantially constitutes the standard peroxide curing agent of the industry in uses such as the curing of polyolefins according to the teachings of U.S. Pat. Nos. 2,888,424 and 3,079,370. Moreover, di-tertiary butyl peroxide provides about twice the amount of active oxygen over that obtainable from an equal amount of weight from the commonly used di-$\alpha$-cumyl peroxide.

Notwithstanding its extensive publication or mention in the patent and other technical literature, and the evident substantial economical advantages of di-tertiary butyl peroxide as a free radical-generating crosslinking agent for polyolefins over the industry standard of di-$\alpha$-cumyl peroxide, di-tertiary butyl peroxide apparently possesses certain characteristics, such as high volatility and a slow rate of decomposition (long half-life), which have greatly hindered its general acceptance and use as a free radical forming crosslink curing agent for polyolefin materials in the polymer industry.

For instance, experience has shown that up to about 60 to 70 percent of this volatile peroxide added can be lost by evaporation using conventional compounding techniques and apparatus, and an article entitled "The Influence Of Peroxide Curing Systems And Carbon Blacks In Ethylene-Propylene Rubber" by Lenas, published in *I&EC Product Research and Development*, pp. 269 to 277, Volume 3, No. 4, December, 1964, for example, reports that from past experience with di-tertiary butyl peroxide, appreciable amounts of up to about 40 percent of the peroxide applied have been lost during compounding or mixing due to its very high degree of volatility.

SUMMARY OF THE INVENTION

This invention comprises an effective method of introducing and admixing liquid di-tertiary butyl peroxide with polyolefin materials, and an economical means of preparing crosslink curable polymeric compounds with polyolefins. The method of this invention includes applying the liquid di-tertiary butyl peroxide to the polymeric material while the polymer is in particulate form, such as beads, pellets or fragmented particles, and confined within an enclosing chamber, and therein introducing the liquid peroxide into the particulate polymeric material beneath the surface of its mass of particles. This method utilizes the normally deleterious high volatility of di-tertiary butyl peroxide to facilitate the distribution of the peroxide curing agent through the curable particulate polymeric material.

OBJECTS OF THE INVENTION

It is a primary object of this invention to provide an effective and improved method of utilizing di-tertiary butyl peroxide as a free radical forming, crosslink curing agent for the crosslinking of polyolefin materials such as polyethylene.

It is also an object of this invention to provide a method of adding liquid di-tertiary butyl peroxide and mixing it with ethylene-containing polymeric compounds without substantial losses of the peroxide.

It is a further object of this invention to provide an economical and effective method of preparing crosslink curable ethylene-containing polymeric compounds including low cost liquid di-tertiary butyl peroxide as a curing agent.

It is an additional object of this invention to utilize the generally adverse high volatility property of di-tertiary butyl peroxide to advantage in effecting its self-distribution within a body of particulate polymer compound, and to facilitate this auto-dispersion while minimizing physical admixing.

DESCRIPTION OF A PREFERRED EMBODIMENT

The method of this invention, which includes adding liquid di-tertiary butyl peroxide curing agent to particles of a polyolefin material confined within an enclosed chamber or container and applying the liquid curing agent into the mass of polyolefin particles below the surface of the mass, comprises the following materials, conditions and detailed procedure.

This invention relates to polyolefin materials comprising ethylene-containing polymers which are crosslink curable with free radical-forming peroxides, such as polyethylene and related polyolefins disclosed as cross-link curable in the prior art. In addition to polyethylene, peroxide curable ethylene-containing polymeric materials include copolymers of ethylene and other polymerizable materials, and mixtures of ethylene polymers or copolymers with other polymeric materials such as the halogen-containing polymers of polyvinyl chloride or chlorinated polyethylene for flame resistance. Copolymers of ethylene include ethylene-propylene copolymers and terpolymers, and ethylene-vinyl acetate, and particularly such copolymers containing at least about 50 mole percent of ethylene, and preferably about 70 mole percent of ethylene.

The peroxide crosslink curable polyolefin material must be in particulate form or discrete bodies of relatively finely divided size, comprising for example, small pellets, beads or fragments of particles sized from about 40 millimeters to about 44 microns, and preferably about 5 millimeters to about 500 microns.

The particulate polyolefin material in the practice of this invention includes compounds of peroxide crosslink curable polymers containing fillers and other conventional compound ingredients including, for example, preservatives such as antioxidants or opacificers, plasticizers or lubricants, pigments, curing accelerators or coagents, ancillary curing agents, and the like commonly used agents or additives.

Typical proportions of peroxides, comprising di-tertiary butyl peroxide or blends thereof with other peroxides, for use in the practice of this invention include about 0.5 to about 6 parts by weight thereof per 100 parts by weight of crosslink curable polyolefin material. However, greater proportions of such peroxides can be used if appropriate.

In the practice of this invention the peroxide crosslink curable polymeric compound in discrete particle form, such as finely divided pellets, is deposited within an enclosing chamber, such as the closable container of a suitable mixing apparatus. The quantity of the particulate curable polymeric compound and/or the volume capacity of the enclosing chamber should be selected or adjusted so that the total batch of the deposited particles of curable polymeric compound substantially fill the chamber, at least to about 50 percent of the volume thereof and preferably to about 80 percent to about 90 percent of its volume.

Liquid di-tertiary butyl peroxide curing agent is then administered to the particulate curable polymeric compound contents substantially filling the chamber by introducing an appropriate quantity of the peroxide into the mass of polymeric compound at a substantial depth below the surface of the body of particles thereof. Preferably the liquid peroxide charge is injected into an internal area of the body of polymeric particles located beneath its surface. For example, the liquid peroxide curing agent can be introduced into the mass of the body of polymeric particles within the chamber by means of a laterally entering conduit passing through a side wall of the enclosing chamber at a location below the surface or uppermost area of the deposited contents thereof. However, the preferred practice of this invention can be carried out by means of a conduit which extends down below the surface of and into an intermediate area of the body of polymeric particles comprising the contents of the chamber and therein discharges the liquid peroxide into an internal area of the particulate contents of the chamber.

Also, the charge of liquid peroxide curing agent for the quantity of polymeric material batch can be added in units of several increments rather than a single addition. This technique enables a faster rate of distribution of the volatile liquid peroxide within the body of polymeric particles by permitting the discharge of the incremental units of peroxide at different internal locations within the particulate mass. Moreover, the distribution of the applied volatile peroxide liquid within the particulate mass can be accelerated by intermingling the particles with a moderate mixing action or agitation such as provided by a slowly revolving impeller blade, stirrer, or tumbling means. Accordingly, the means of this invention utilize and facilitate to the maximum advantage the highly volatile characteristics of di-tertiary peroxide to expedite the dispersion of the curing agent through the curable polymeric material which contributes to a more uniformly cured product.

An example of the practice of this invention is provided by the following illustration of a preferred mode of carrying it out. In the hereinafter example the di-tertiary butyl peroxide curing agent is applied to a typical crosslink curable polymeric compound having an overall composition given in the following relative parts by weight:

| | Parts By Weight |
|---|---|
| Polyethylene beads (approx. 4mm) | 100 |
| Silica Filler | 50 |
| Antioxidant - Flectol H, Monsanto (polymerized dihydrotrimethylquinoline) | 0.5 |
| Octamethylcyclotetrasiloxane | 0.5 |
| Di-tertiary butyl peroxide curing agent | 1.4 |

All ingredients of the composition for this example except the peroxide curing agent, are mixed to a uniform blend of particulate compound, and a 50 pound batch of the particulate blended compound is placed in a 50 gallon mixing chamber of a commercial Henschel mixer and therein cooled to a temperature of about 30° – 35° C. Next the end of a conduit is passed down through the open top of the chamber and inserted into the surface on the batch of particulate polymer compound and extended down therein for a depth of at least about two inches, and the di-tertiary butyl peroxide curing agent is introduced through the conduit into the body of particles substantially below the surface of its mass. After adding the peroxide the combined ingredients are slowly stirred to expedite the dispersion of the di-tertiary butyl peroxide uniformly within the body of particulate compound.

In addition to the specific means of administering the di-tertiary butyl peroxide curing agent into the interior portion of the mass of particulate polymeric compound given in the foregoing example, a number of variations thereon can be employed within the spirit of this invention to achieve the economics and benefits thereof comprising the utilization of di-tertiary butyl peroxide's property of a very high degree of volatility to effectively disperse itself relatively evenly among the particles within the mass of polymeric compound at relatively low temperatures and with a minimum of physical agitation.

Optimum effects are produced when the di-tertiary butyl peroxide curing agent is introduced into the body of particles at a location deep within its mass of particles such as a central portion of the body as opposed to the addition and dispersal of the curing agent at a superficial location of the body of particles. A deep internal introduction of the peroxide curing agent according to this invention can be achieved by extending a feed conduit for the curing agent a substantial distance into the mass of particulate polymeric compound, or by injecting the curing agent by means of high pressures deep into the mass of particles.

The extension of the curing agent feed conduct into a chamber, such as a mixing vessel, so as to penetrate deep into the body of the particulate contents of the chamber for the purpose of discharging the curing agent into the interior of central portions of the particulate mass, can be a fixed arrangement such as a projecting pipe, or a movable arrangement such as a telescoping or flexible conduct, or an articulated or hinged pipe. Moreover, depending upon the type and/or location of the mixing mechanism associated with the chamber for the practice of this invention, and practical consideration in general, the peroxide feed line or conduct can enter or extend through the top, sides or bottom of the enclosing chamber, and can comprise a permanently fixed connection associated with the chamber such as a pipe joined therewith, or a flexible hose which intermittently enters the chamber through a closeable charging entry or other ports therein.

Another suitable technique for the effective practice of this invention comprises depositing only a portion of the batch of particulate polymeric compound to the mixing chamber, and thereafter introducing the di-tertiary butyl peroxide curing agent to the deposited portion of the batch followed by the prompt addition of the remaining or a subsequent portion of the batch or particulate polymeric compound over and substantially covering the area of the introduced curing agent whereby the introduced curing agent is very quickly covered and thus enclosed a substantial depth below the surface of and deep within the mass of particulate polymeric compound and as such optimumly positioned for rapid and effective dispersion within the mass by volatization and diffusion and/or light mixing.

This technique of incremental addition of the batch and also the peroxide curing agent can be practiced in any number of partial additions of either or both the polymer compound and curing agent which are practical. Moreover this system can be employed in a cascading sequence of depositing a small quantity of the particulate polymeric compound, such as for example first depositing about one-third of the total batch quantity, introducing about one-half of the amount of curing agent, then another third of the particulate polymeric compound, another one-half of curing agent followed by the last third of the particulate polymeric compound. After a brief mixing to implement the dispersion of the curing agent, about one-third of the batch with the curing agent dispersed within, can be discharged from the mixing chamber for processing such as molding to shape and curing, whereupon another amount of about one-third of a total batch quantity of curing agent is introduced followed by about one-third of a total batch of particulate polymeric compound. After brief mixing, another one-third of the admixed combination can be again discharged, and the sequence repeated indefinitely over and over again.

As is apparent, in the foregoing system the effect is that the di-tertiary butyl peroxide curing agent of each introduction is quickly enveloped with the body of particulate polymeric compound whereby the volatile property of this peroxide is aptly utilized to advantage and its adversitites are overcome.

What we claim as new and desire to secure by Letters Patent of the United States is:

1. A method of effectively and rapidly dispersing and admixing liquid di-tertiary butyl peroxide with a peroxide crosslink curable polymeric polyolefin, comprising the steps of depositing a mass of particulate polyolefin material within a chamber, introducing a quantity of liquid di-tertiary butyl peroxide into the particulate polyolefin material a substantial depth below the surface of its mass, and admixing the particulate polyolefin material containing the introduced di-tertiary butyl peroxide therein to disperse the peroxide over the particles and within the mass of the polyolefin.

2. The method of claim 1, wherein the particulate polyolefin material comprises at least one ethylene-containing polymeric material selected from the group consisting of polyethylene, polypropylene, copolymers of ethylene and other copolymerizable materials, and mixtures of ethylene-containing polymers and other polymeric materials.

3. The method of claim 1, wherein the particulate polyolefin material comprises a filler.

4. The method of claim 1, wherein the di-tertiary butyl peroxide introduced into the particulate polyolefin material is in an amount of about 0.5 to about 6 parts by weight per 100 parts by weight of polyolefin material.

5. A method of effectively and rapidly dispersing and admixing liquid di-tertiary butyl peroxide with an ethylene-containing polymeric material, comprising the steps of depositing a mass of particulate ethylene-containing polymeric material within a chamber and substantially filling said chamber with the polymeric material, introducing a quantity of liquid di-tertiary butyl peroxide into the particulate ethylene-containing polymeric material a substantial depth below the surface and within an internal area of its mass, and admixing the particulate ethylene-containing polymeric material and the internally introduced di-tertiary butyl peroxide therein to disperse the peroxide over the particles and within the mass of ethylene-containing polymeric material.

6. The method of claim 5, wherein the particulate polyolefin material comprises at least one ethylene-containing polymeric material selected from the group consisting of polyethylene, polypropylene, copolymers of ethylene and other copolymerizable materials, and mixtures of ethylene-containing polymers and other polymeric materials.

7. The method of claim 6, wherein the ethylene-containing polymeric material comprises a filler.

8. The method of claim 7, wherein the di-tertiary butyl peroxide introduced into the particulate polyolefin material is in an amount of about 0.5 to about 6 parts by weight per 100 parts by weight of the polymer containing ethylene.

9. The method of claim 8, wherein the di-tertiary butyl peroxide is introduced in increments into the particulate ethylene-containing polymeric material.

10. The method of claim 8, wherein the di-tertiary butyl peroxide is introduced a substantial depth below the surface of the particulate ethylene-containing polymeric material and into an internal area of its mass by injecting the peroxide through a conduit extending into the mass of said particulate ethylene-containing polymeric material.

11. A method of effectively and rapidly dispersing and admixing liquid di-tertiary butyl peroxide with an ethylene-containing polymeric compound, comprising the steps of depositing a mass of particulate ethylene-containing polymeric material within an enclosed chamber and substantially filling said chamber with the polymeric material, introducing a quantity of liquid di-tertiary butyl peroxide into the particulate ethylene-containing polymeric material a substantial depth below the surface and within an internal area of its mass by injecting the liquid peroxide through a conduit extending into the mass of said particulate ethylene-containing polymeric material substantially filling the enclosed chamber, and admixing the particulate ethylene-containing polymeric material and the internally introduced di-tertiary butyl peroxide therein to disperse the peroxide over the particles and within the mass of ethylene-containing polymeric material.

12. The method of claim 11, wherein the particulate polyolefin material comprises at least one ethylene-containing polymeric material selected from the group consisting of polyethylene, polypropylene, copolymers of ethylene and other copolymerizable materials, and mixtures of ethylene-containing polymers and other polymeric material.

13. The method of claim 12, wherein the ethylene-containing polymeric material comprises a filler.

14. The method of claim 12, wherein the di-tertiary butyl peroxide introduced into the particulate polyolefin material is in an amount of about 0.5 to about 6 parts by weight per 100 parts by weight of the polymer containing ethylene.

15. The method of claim 12, wherein the di-tertiary butyl peroxide is introduced in increments into the particulate ethylene-containing polymeric material.

16. A method of effectively and rapidly dispersing and admixing liquid di-tertiary butyl peroxide with a polymeric polyolefin, comprising the steps of depositing a mass of particulate polyolefin material within a chamber, introducing a quantity of liquid di-tertiary butyl peroxide by injection under pressure into the particulate polyolefin material a substantial depth below the surface of its mass, and admixing the particulate polyolefin material containing the introduced di-tertiary butyl peroxide therein to disperse the peroxide over the particles and within the mass of the polyolefin.

17. The method of claim 16, wherein the particulate polyolefin material comprises at least one ethylene-containing polymeric material selected from the group consisting of polyethylene, polypropylene, copolymers of ethylene and other copolymerizable materials, and mixtures of ethylene-containing polymers and other polymeric materials.

18. The method of claim 17, wherein the ethylene-containing polymeric material comprises a filler.

19. The method of claim 18, wherein the di-tertiary butyl peroxide introduced into the particulate polyolefin material is in an amount of about 0.5 to about 6 parts by weight per 100 parts by weight of the ethylene-containing polymer.

20. The method of claim 19, wherein the di-tertiary butyl peroxide is introduced in increments into the particulate ethylene-containing polymeric material.

21. A method of effectively and rapidly dispersing and admixing liquid di-tertiary butyl peroxide with a peroxide crosslink curable polymeric polyolefin, comprising the steps of depositing a mass of particulate polyolefin material within an enclosed chamber, introducing a quantity of liquid di-tertiary butyl peroxide into the particulate polyolefin material a substantial depth below the surface of its mass by first depositing a portion of a batch of the particulate polyolefin material in the chamber, then introducing the peroxide to the first portion of particulate polyolefin material and promptly thereafter depositing another portion of the batch of the particulate polyolefin material, over the first portion thereof, and admixing the particulate polyolefin material containing the introduced di-tertiary butyl peroxide therein to disperse the peroxide over the particles and within the mass of the polyolefin.

22. The method of claim 21, wherein the particulate polyolefin material comprises at least one ethylene-containing polymeric material selected from the group consisting of polyethylene, polypropylene, copolymers of ethylene and other copolymerizable materials, and mixtures of ethylene-containing polymers and other polymeric materials.

23. The method of claim 22, wherein the ethylene-containing polymeric material comprises a filler.

24. The method of claim 23, wherein the di-tertiary butyl peroxide introduced into the particulate polyolefin material is in an amount of about 0.5 to about 6 parts by weight per 100 parts by weight of the polymer containing ethylene.

25. The method of claim 21, wherein the mass of particulate polyolefin material and the di-tertiary butyl peroxide are respectively alternatively deposited and introduced in increments into the enclosed chamber.

* * * * *